(12) United States Patent
Shiosaka (10) Patent No.: US 12,043,455 B2
(45) Date of Patent: Jul. 23, 2024

(54) STORAGE CASE

(71) Applicant: SUZUKI MOTOR CORPORATION, Hamamatsu (JP)

(72) Inventor: Taku Shiosaka, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 87 days.

(21) Appl. No.: 17/213,467

(22) Filed: Mar. 26, 2021

(65) Prior Publication Data
US 2021/0300637 A1     Sep. 30, 2021

(30) Foreign Application Priority Data

Mar. 27, 2020 (JP) .................. 2020-058061

(51) Int. Cl.
| | |
|---|---|
| *B65D 43/22* | (2006.01) |
| *B65D 25/28* | (2006.01) |
| *B65D 43/16* | (2006.01) |

(52) U.S. Cl.
CPC ......... *B65D 43/22* (2013.01); *B65D 25/2858* (2013.01); *B65D 43/163* (2013.01)

(58) Field of Classification Search
CPC .. B65D 43/22; B65D 25/2858; B65D 43/163; B62J 9/24; B62J 9/27; B62J 9/30
USPC ....................................................... 220/324
See application file for complete search history.

(56) References Cited

U.S. PATENT DOCUMENTS

| | | | | |
|---|---|---|---|---|
| 2,893,771 A | * | 7/1959 | Claud-Mantle .... | B65D 25/2852 292/113 |
| 3,078,896 A |   | 2/1963 | Abrams |   |
| 5,653,001 A | * | 8/1997 | Lane ..................... | E05C 17/045 16/340 |
| 6,234,723 B1 | * | 5/2001 | Thalmayr .............. | B65G 51/06 406/188 |
| 8,631,959 B2 | * | 1/2014 | Yang ..................... | B65D 25/325 220/756 |
| 10,183,626 B2 |   | 1/2019 | Thomas |   |
| 10,434,206 B2 | * | 10/2019 | Thomas .................. | A61L 2/26 |

(Continued)

FOREIGN PATENT DOCUMENTS

| | | | | | |
|---|---|---|---|---|---|
| CN | 105473070 A | * | 4/2016 | ......... | A61B 10/0045 |
| CN | 208698964 U | * | 4/2019 | ............... | B62J 9/30 |

(Continued)

OTHER PUBLICATIONS

Office Action issued in Indian Application No. 202114013617 dated Aug. 26, 2022.
Office Action issued in Japanese Patent Application No. 2020-058061 dated Sep. 26, 2023. (with English translation).

(Continued)

*Primary Examiner* — Nathan J Jenness
*Assistant Examiner* — Eric C Baldrighi
(74) *Attorney, Agent, or Firm* — TROUTMAN PEPPER HAMILTON SANDERS LLP (57) ABSTRACT

A storage case where a case cover is openably and closably connected to a case body, the storage case includes a latch mechanism fixing the case cover to the case body and a handle swingably connected to the case body. The handle includes a support arm swinging about a swing shaft extending in a case width direction, and a grip extending from the support arm in the case width direction. A part of the latch mechanism is located on a side of the grip from the support arm in the case width direction when the handle is downed.

7 Claims, 8 Drawing Sheets

(56) References Cited

U.S. PATENT DOCUMENTS

| | | | |
|---|---|---|---|
| 10,538,941 B2 | 1/2020 | Roatis et al. | |
| 11,338,051 B2 * | 5/2022 | Lin | A61L 2/14 |
| 11,761,249 B2 * | 9/2023 | Shiosaka | B62J 9/30 |
| | | | 292/150 |
| 2011/0127264 A1 * | 6/2011 | Whalen | A45C 5/03 |
| | | | 220/203.01 |
| 2012/0317933 A1 * | 12/2012 | Crull | E05C 3/048 |
| | | | 220/324 |
| 2014/0251999 A1 * | 9/2014 | Ely | E05B 65/5276 |
| | | | 292/256 |
| 2015/0159404 A1 * | 6/2015 | Treadwell | E05B 15/0093 |
| | | | 220/326 |
| 2015/0191945 A1 | 7/2015 | Yamaguchi et al. | |
| 2018/0352927 A1 * | 12/2018 | Wang | G03B 17/08 |

FOREIGN PATENT DOCUMENTS

| | | | | |
|---|---|---|---|---|
| EP | 2 586 687 A2 | 5/2013 | | |
| EP | 2586687 A2 * | 5/2013 | ............... | B62J 7/08 |
| JP | S61-022786 Y2 | 7/1986 | | |
| JP | H09-051174 A | 2/1997 | | |
| JP | 4386625 B2 | 12/2009 | | |
| JP | 2013-95227 A | 5/2013 | | |
| KR | 200446301 Y1 * | 7/2009 | ............... | B62J 9/30 |
| KR | 101449302 B1 * | 10/2014 | ............... | B62J 9/30 |
| WO | 2014021162 A1 | 2/2014 | | |

OTHER PUBLICATIONS

Office Action issued in Indian Application No. 20211403617 dated Feb. 26, 2024.

* cited by examiner

STORAGE CASE

CROSS-REFERENCE TO RELATED APPLICATION

This application is based on Japanese Patent Application No. 2020-058061 filed on Mar. 27, 2020, the contents of which are incorporated herein by way of reference.

FIELD OF INVENTION

The present invention relates to a storage case.

BACKGROUND

A storage case whose closed state is maintained by a so-called draw latch mechanism is known (for example, see JP-A-2013-095227). In the storage case described in JP-A-2013-095227, a case cover is openably and closably connected to a case body, and a storage space is formed by the case body and the case cover. A pair of hanging fittings are provided on a front surface of the case body, a pair of receiving fittings are provided on a front surface of the case cover, and the storage case is locked in a state in which the case cover is closed by pushing down a lock lever of the hanging fittings while the hanging fittings are hooked to the receiving fittings.

SUMMARY OF INVENTION

The storage case described in JP-A-2013-095227 is provided with a handle, and a pair of hooking metal fittings and a pair of receiving metal fittings are provided at two locations spaced apart from each other in a case width direction with the handle sandwiched therebetween. Therefore, two draw latch mechanisms are required for the storage case, which results in an increase in the number of components, and an occupied area of the draw latch mechanism and the handle is increased, which results in an increase in a size of the storage case.

The present invention has been made in view of the above circumstances, and an object thereof is to provide a storage case capable of suppressing an increase in the number of components and reducing a size of the case.

A storage case according to an aspect of the present disclosure, the storage case in which a case cover is openably and closably connected to a case body, the storage case includes a latch mechanism configured to fix the case cover to the case body, and a handle swingably connected to the case body, in which the handle includes a support arm swinging about a swing shaft extending in a case width direction, and a grip extending from the support arm in the case width direction, and a part of the latch mechanism is located on a side of the grip from the support arm in the case width direction when the handle is downed, so that the above problem is solved.

DETAILED DESCRIPTION

In a storage case of one aspect of the present invention, a case cover is openably and closably connected to a case body. The case body is provided with a latch mechanism for fixing the case cover, and a handle is swingably connected to the case body. The handle includes support arm swinging about a swing shaft extending in a case width direction, and a grip extending from the support arm in the case width direction. When the handle is downed, since a part of the latch mechanism is located on a side of the grip from the support arm in the case width direction, the handle and the latch mechanism do not interfere with each other, and the handle and the latch mechanism can be compactly installed on one surface of the storage case. Therefore, the number of components of the storage case can be reduced, and spaces occupied by the handle and the latch mechanism can be reduced, so that a size of the storage case can be reduced.

Figure 1:
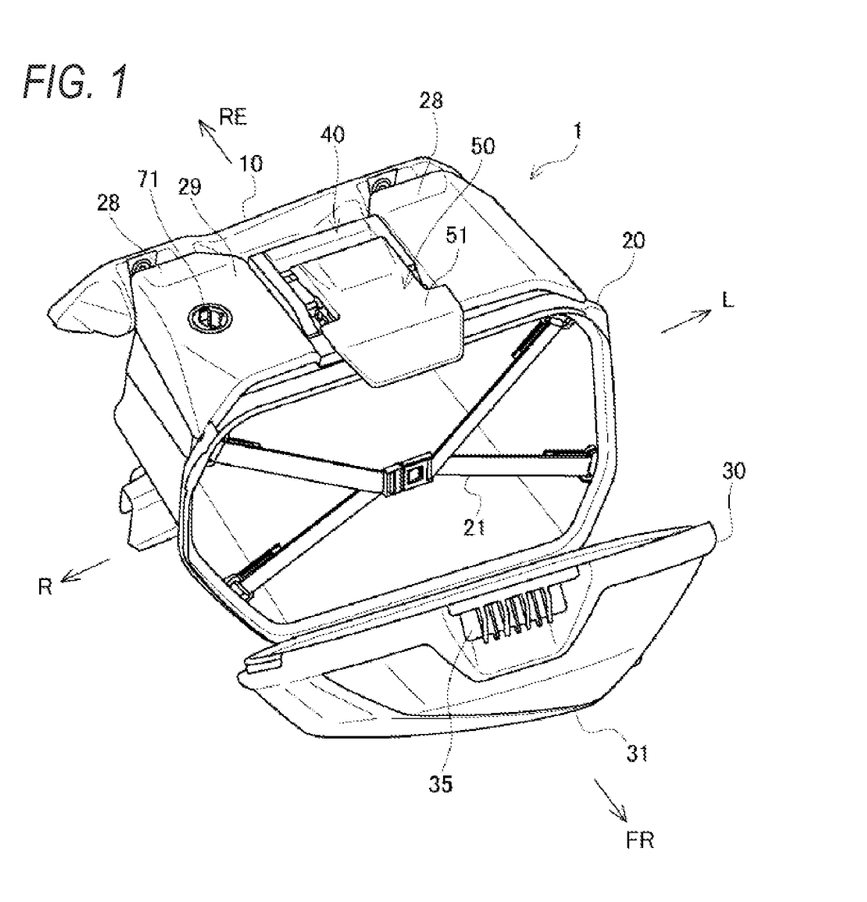
FIG. 1 is a perspective view of a storage case according to the present embodiment.

Hereinafter, the present embodiment will be described in detail with reference to the accompanying drawings. In the following description, a storage case, as a side case, that is attached to a vehicle such as a saddle-type vehicle will be described. However, the storage case of the present embodiment can be applied to other storage cases such as a rear box on a loading platform, a trunk case with casters, and a baggage bag. In the following figures, an arrow FR indicates a case front side, an arrow RE indicates a case rear side, an arrow L indicates a case left side, and an arrow R indicates a case right side. FIG. 1 is a perspective view of the storage case according to the present embodiment.

As illustrated in FIG. 1, a storage case 1 is detachably attached to a case holder 10 on a side portion of the vehicle. A front surface of a case body 20 of the storage case 1 is open, and the case cover 30 is connected to a lower edge of the case body 20 so as to be openable downward via a hinge. A baggage storage space is formed by the case body 20 and the case cover 30, and the case body 20 is provided with an X-shaped inner band 21 for holding the baggage stored in the storage space. Hemispherical elastic legs (not illustrated) are provided at four corners of a bottom surface of the storage case 1, so that the storage case 1 can stand by itself in a stable state even when the storage case 1 is removed from the vehicle.

A handle 40 that makes the storage case 1 portable is swingably connected to the center of an upper surface of the case body 20. A latch mechanism 50 for fixing the case cover 30 to the case body 20 while the case cover 30 is closed is installed inside the handle 40. Further, an upper cover 29 is attached to the upper surface of the case body 20 so as to surround the handle 40 and the latch mechanism 50. A key cylinder 71 of the locking mechanism 70 (see FIG. 6) is exposed from the upper cover 29, and the latch mechanism 50 and the handle 40 can be locked and unlocked by a key inserted into a keyhole of the key cylinder 71.

Such a storage case 1 is required to have a compact structure. In a general storage case, a layout of the handle and the latch mechanism is not sufficiently considered. If the handle and the latch mechanism are largely separated from each other, the number of components may increase and the structure of the storage case may become complicated, and a storage volume of the storage case may be compressed due to the number of components and the complexity of the structure. Therefore, in the storage case 1 of the present embodiment, a base end side of a latch arm 51 is accommodated inside the handle 40, and the handle 40 and the latch mechanism 50 are compactly installed on an upper portion of the storage case 1.

Figure 2:
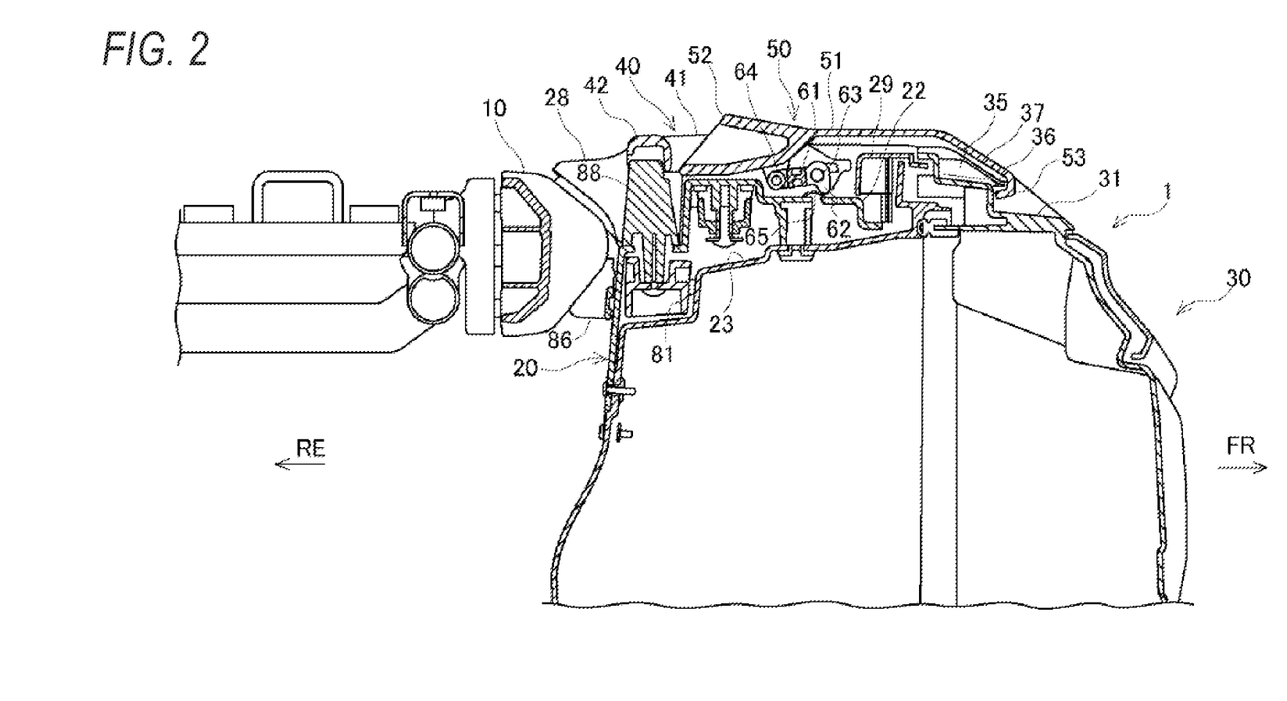
FIG. 2 is a partial cross-sectional view of the storage case according to the present embodiment.
Figure 3:
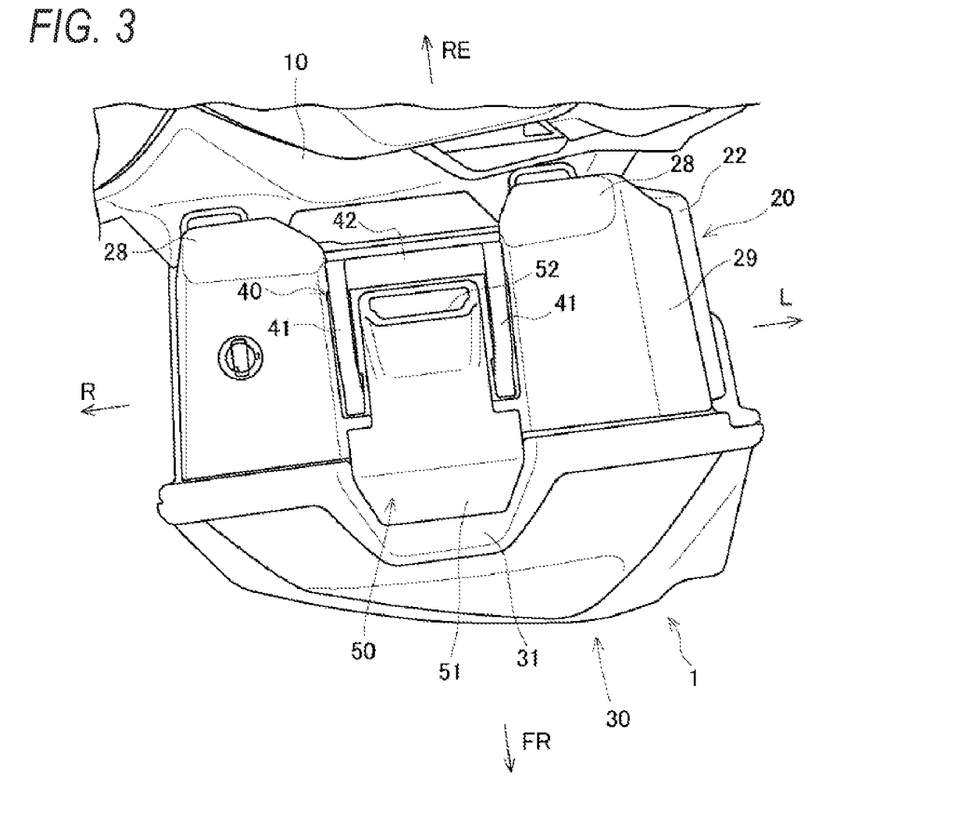
FIG. 3 is a plan view of the storage case according to the present embodiment.
Figure 4:
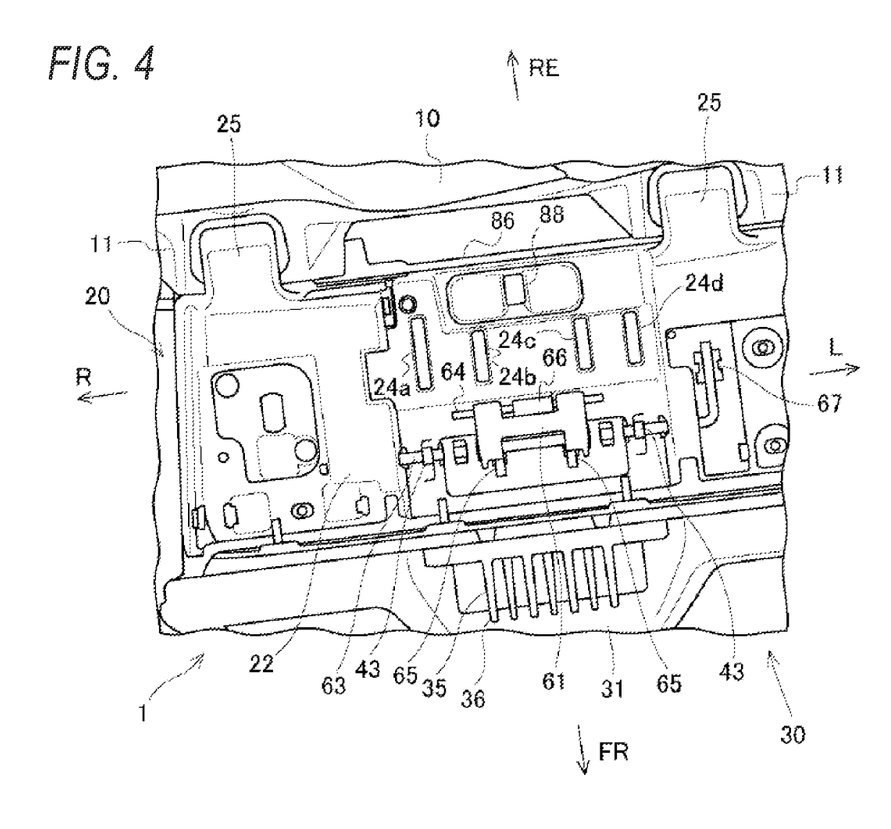
FIG. 4 is a partial plan view of the storage case according to the present embodiment.
Figure 5:
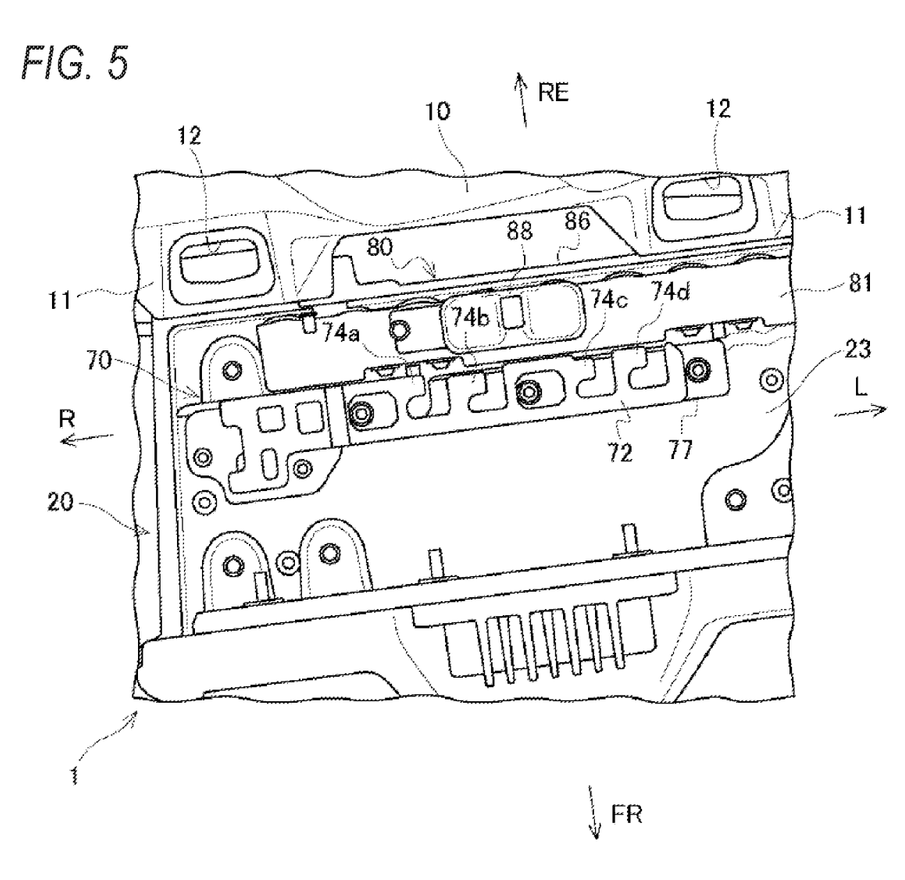
FIG. 5 is a partial plan view of the storage case according to the present embodiment.
Figure 6:
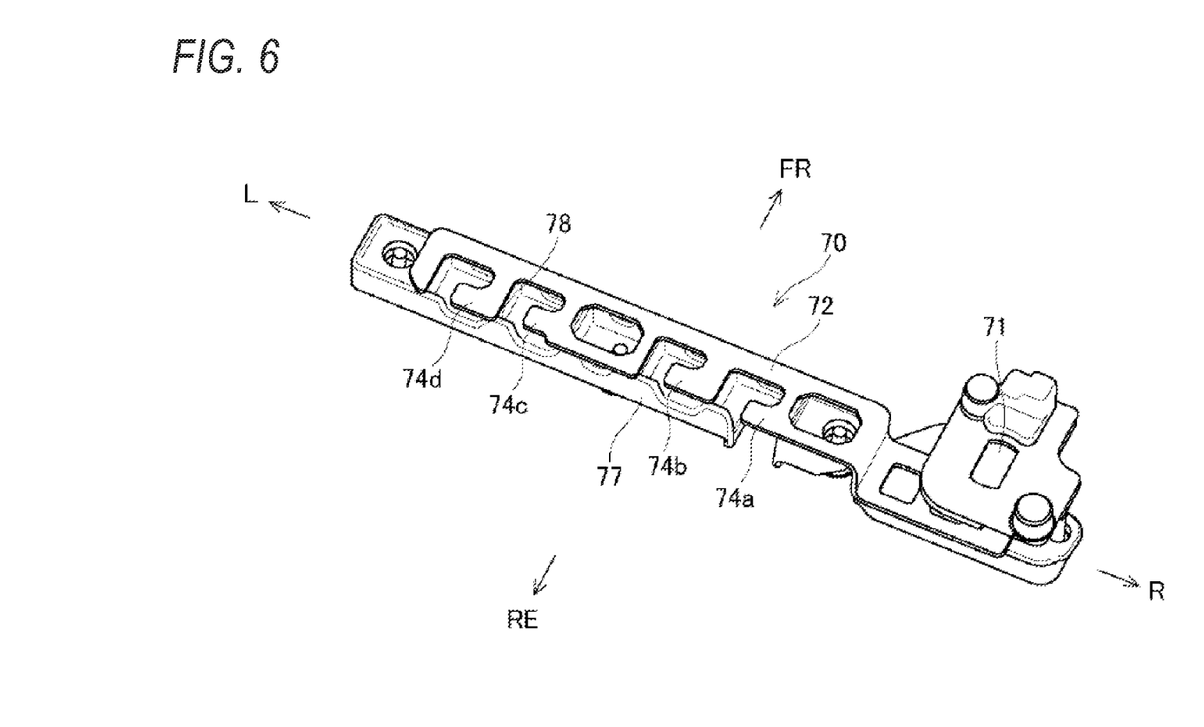
FIG. 6 is a perspective view of a locking mechanism according to the present embodiment.
Figure 7:
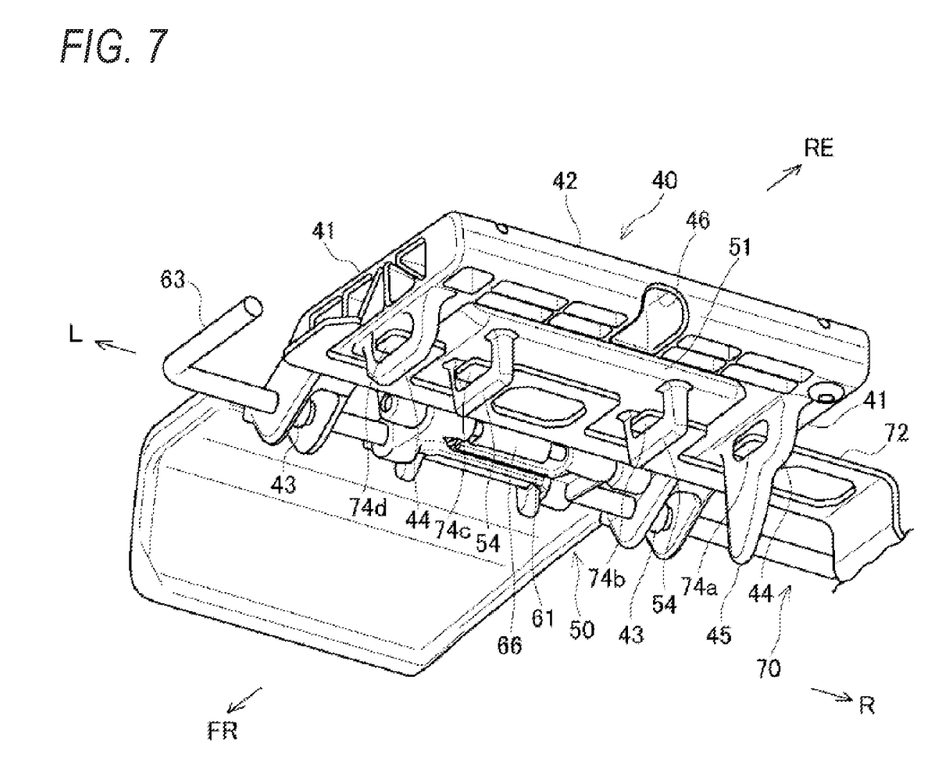
FIG. 7 is a perspective view illustrating a locked state according to the present embodiment.

An upper structure of the storage case will be described with reference to FIGS. 2 to 7. FIG. 2 is a partial cross-sectional view of the storage case according to the present embodiment. FIG. 3 is a plan view of the storage case according to the present embodiment. FIG. 4 is a partial plan view of the storage case according to the present embodiment. FIG. 5 is a partial plan view of the storage case according to the present embodiment. FIG. 6 is a perspective view of the locking mechanism according to the present embodiment. FIG. 7 is a perspective view illustrating a locked state according to the present embodiment. Incidentally, FIG. 4 illustrates a state in which the upper cover, the latch arm, and the handle are removed from the storage case, and FIG. 5 illustrates a state in which an installation cover is further removed.

As illustrated in FIGS. 2 to 4, an upper portion of the case body 20 is formed by an installation cover 22 on which various mechanisms are installed. The upper cover 29 is attached to an upper portion of the installation cover 22 so as to expose the center of an upper surface thereof, and the latch mechanism 50 and the handle 40 are installed on the exposed portion of the installation cover 22 (in particular, see FIG. 3). The latch arm 51 is provided on the upper portion of the installation cover 22 as a hooking fitting of the latch mechanism 50, and an arm receiving portion 35 including a plurality of plate-shaped protrusions are provided on an upper portion of the case cover 30 as receiving fitting of the latch mechanism 50. The latch arm 51 is connected to the installation cover 22 via a connecting arm 61.

The connecting arm 61 is formed in an H shape in a plan view in which a pair of left and right arm portions are included (particularly, see FIG. 4). A base end side of the connecting arm 61 is connected to the installation cover 22 via a first swinging pin 63, and a tip side of the connecting arm 61 is connected to the latch arm 51 via a second swinging pin 64. A cam 62 (particularly, see FIG. 2) is formed on the base end side of the connecting arm 61, and repulsion springs 65 each having an arch shape in a side view that repels the swing of the connecting arm 61 are installed on the installation cover 22. When the connecting arm 61 swings about the first swinging pin 63 and the cam 62 is in elastic contact with the repulsion springs 65, the connecting arm 61 is held in a standing posture in which the latch arm 51 is pushed up and a lying posture in which the latch arm 51 is pulled down.

The latch arm 51 is formed in a wide plate shape extending from the tip side of the connecting arm 61 toward the case cover 30. A cylindrical gripping portion 52 is formed on a base end side of the latch arm 51, and the latch arm 51 is lifted by the gripping portion 52. Further, the base end side of the latch arm 51 is pushed in a pushing-up direction (opening direction) by a torsion spring 66 (in particular, see FIG. 4) mounted on the second swinging pin 64. A hook 53 bent in a C shape in the side view is formed on a tip side of the latch arm 51. When the hook 53 is hooked to a tip of the arm receiving portion 35, the case cover 30 is locked to the case body 20 in the closed state.

A recessed portion 31 is formed in the upper portion of the case cover 30 such that the hook 53 of the latch arm 51 enters, and a bottom surface of the recessed portion 31 is formed in a stepped shape having two upper and lower stages. In the upper stage of the recessed portion 31, the arm receiving portion 35 having a comb shape in the plan view are provided in a case width direction (a left-right direction). A locking claw 36 protruding forward from the upper stage of the recessed portion 31 is formed on a tip side of the arm receiving portion 35. An inclined surface 37 (particularly, see FIG. 2) for guiding the hook 53 of the latch arm 51 toward a claw tip of the locking claw 36 is formed on an upper surface of the arm receiving portion 35. When the hook 53 abuts on the inclined surface 37, the hook 53 is guided to a locking position at which the hook 53 is hooked to the locking claw 36.

The inclined surface 37 of the arm receiving portion 35 is formed in a range from a predetermined position on the base end side from the locking claw 36 to the claw tip. In the present embodiment, the inclined surface 37 is formed substantially horizontally from a base end to a substantially intermediate position of the arm receiving portion 35, and is inclined such that the thickness of the arm receiving portion 35 decreases from the substantially intermediate position to the claw tip. The arm receiving portion 35 is formed in an elongated shape in the plan view and facilitates resin molding. The inclined surface 37 may be inclined linearly as in the present embodiment, may be inclined while being curved in a convex shape, or may be inclined while being curved in a concave shape.

The handle 40 is formed in a U shape in the plan view by a pair of support arms 41 that swing about the first swinging pin 63 and a grip 42 that connects the pair of support arms 41. The handle 40 is swingably connected to the same installation cover 22 to which the latch arm 51 is connected, and the base end side of the latch arm 51 is accommodated inside the U-shaped handle 40 in the plan view when the handle 40 is downed. Accordingly, the handle 40 and the latch arm 51 are compactly installed in an installation space on the installation cover 22. Base end sides of the pair of support arms 41 are pushed in a retracting direction (closing direction) by a pair of torsion springs 43 (in particular, see FIG. 4) mounted on the first swinging pin 63.

The first swinging pin 63 extends in the case width direction, and the connecting arm 61 is supported on an inner side in the case width direction of the first swinging pin 63, and the handle 40 is supported on an outer side in the case width direction of the first swinging pin 63. Since the first swinging pin 63 is used for both the connecting arm 61 and the handle 40, the number of components and the cost are reduced, and the latch mechanism 50 and the handle 40 are installed more compactly. Further, one end of the first swinging pin 63 is bent in an L shape, and a tip of the bent portion is restricted from rotating by a holding portion 67 on the installation cover 22. The holding portion 67 suppresses the rotation of the first swinging pin 63 and prevents the handle 40 and the latch arm 51 from rotating together.

As illustrated in FIGS. 5 to 7, the locking mechanism 70 for locking the latch mechanism 50 and the handle 40 simultaneously is provided on a case portion 23 below the installation cover 22. The locking mechanism 70 slides a lock plate 72 connected to the key cylinder 71 in the case width direction (left-right direction) with respect to a plate support portion 77 fixed to the case body 20 (the case portion 23). The plate support portion 77 is formed in a box shape of which an upper surface is open and the case width direction is set as a long side. Convex portions 78 (particularly, see FIG. 6) are formed on a side wall of the plate support portion 77 so as to be in point contact or line contact with the lock plate 72 and suppress a sliding resistance with respect to the lock plate 72.

The lock plate 72 is formed in a strip shape extending in the case width direction. Four locking pieces 74*a* to 74*d* that hook the lock plate 72 and the handle 40 are formed on the lock plate 72. The pair of locking pieces 74*b*, 74*c* hook the latch arm 51 on the inner side in the case width direction, and the pair of locking pieces 74*a*, 74*d* hook the handle 40 on the outer side in the case width direction. A pair of latch receiving portions 54 hooked to the pair of locking pieces 74*b*, 74*c* are formed on the latch arm 51, and a pair of handle receiving portions 44 hooked to the pair of locking pieces 74*a*, 74*d* are formed on the handle 40.

Openings which the pair of locking pieces 74*b*, 74*c* enter are formed in the pair of latch receiving portions 54, and openings which the pair of locking pieces 74*a*, 74*d* enter are formed in the pair of handle receiving portions 44. Four slits 24*a* to 24*d* (see FIG. 4) are formed in the installation cover 22 so as to correspond to the pair of latch receiving portions 54 and the pair of handle receiving portions 44. The pair of latch receiving portions 54 protrude to the lower side of the installation cover 22 through the slits 24*b*, 24*c* on the inner side in the case width direction, and the pair of handle receiving portions 44 protrude to the lower side of the installation cover 22 through the slits 24*a*, 24*d* on the outer side in the case width direction.

The lock plate 72 is slid on the plate support portion 77 by an operation of the key inserted into the key cylinder 71 (see FIG. 6). When the lock plate 72 is slid to a left side, the locking pieces 74*a* to 74*d* enter the openings of the pair of latch receiving portions 54 and the pair of handle receiving portions 44. Tips of the four locking pieces 74*a* to 74*d* pass through the slits 24*a* to 24*d* and face an inner side surface of the installation cover 22 (not illustrated). Accordingly, the latch mechanism 50 and the handle 40 are locked. When the lock plate 72 is slid to a right side, the locking pieces 74*a* to 74*d* come off the openings of the pair of latch receiving portions 54 and the pair of handle receiving portions 44 to unlock the latch mechanism 50 and the handle 40. A protruding portion 45 for preventing erroneous locking is provided at a lower portion of one handle receiving portion 44 such that the handle 40 does not descend in the locked state.

At this time, since the latch receiving portions 54 and the handle receiving portions 44 are arranged in the case width direction, the latch receiving portions 54 and the handle receiving portions 44 are simultaneously hooked by the single lock plate 72 that is long in the case width direction. When the lock plate 72 is slid in the case width direction, the latch mechanism 50 and the handle 40 are simultaneously locked and unlocked by the lock plate 72. Therefore, the locking mechanism 70 is also used for both the latch mechanism 50 and the handle 40, and the number of components of the locking mechanism 70 is reduced. Further, since the latch receiving portion 54 and the handle receiving portion 44 are close to each other, the lock plate 72 is formed short to improve the durability of the locking mechanism 70.

As described above, the storage case 1 is attached to the vehicle via the case holder 10. A pair of locking portions 11 (in particular, see FIG. 5) protrude from a front surface of the case holder 10, and locking holes 12 are formed in the respective locking portions 11. A pair of fixing hooks 25 (see FIG. 4) protrude from a rear surface of the installation cover 22, and a tip side of each fixing hook 25 is bent downward. Since the tip sides of the pair of fixing hooks 25 of the installation cover 22 enter the pair of locking holes 12 of the case holder 10, the storage case 1 is detachably hooked to the case holder 10 at two places spaced apart from each other in the case width direction. An eaves portion 28 (see FIG. 2) is formed in the storage case 1 and covers a portion to be hooked to the locking portion 11 to improve design.

Further, a fixing mechanism 80 that fixes a hooked state with respect to the case holder 10 is provided on the case portion 23 below the installation cover 22 (see FIG. 4). The fixing mechanism 80 includes a slider 81 stored inside the case body 20 and a slide hook 86 sliding integrally with the slider 81 outside the case body 20. The slider 81 is formed in a prismatic shape having a long side in the case width direction, and is stored so as to be slidable in the case width direction by a wall surface of the case body 20. A knob portion 88 having a convex shape in the side view is provided on an upper surface of the slider 81, and is exposed from an upper surface of the installation cover 22 (see FIG. 4).

The slider 81 is slid by the operation of the knob portion 88, and the slide hook 86 on a rear surface of the case body 20 is slid. When the slider 81 is slid to the left side, the slide hook 86 is spaced apart from the pair of locking portions 11. The hooked state of the storage case 1 is released by the slide hook 86, and the storage case 1 is detachably hooked to the case holder 10. When the slider 81 is slid to the right side, the slide hook 86 abuts on the pair of locking portions 11. The hooked state of the storage case 1 is fixed by the slide hook 86, and the storage case 1 is undetachably hooked to the case holder 10.

In this way, the slider 81 is slid between an attachment/detachment position where the storage case 1 is attachable and detachable and a fixed position where the storage case 1 is not attachable or detachable. A recess 46 for positioning the slider 81 in the fixed position is formed in the grip 42 of the handle 40 (see FIG. 7). In this case, the knob portion 88 is positioned directly below the grip 42 when the handle 40 is downed, and the recess 46 of the grip 42 corresponds to the knob portion 88 when the slider 81 is positioned at the fixed position. When a tip of the knob portion 88 enters the recess 46, the slider 81 is positioned at the fixed position, and the slider 81 is held at the fixed position by the handle 40.

When the slider 81 is not positioned at the fixed position, the knob portion 88 interferes with the grip 42, so that the handle 40 cannot be completely downed. The pair of handle receiving portions 44 enter the slits 24*a*, 24*d* (see FIG. 4) of the installation cover 22 halfway, and hinder the sliding of the lock plate 72 of the locking mechanism 70. In this way, the locking mechanism 70 can lock the handle 40 and the latch mechanism 50 only when the slider 81 is positioned at the fixed position. Therefore, the handle 40 and the latch mechanism 50 are not locked in a state in which the storage case 1 is attachable to and detachable from the case holder 10.

On the other hand, when the slider 81 is positioned at the fixed position, the knob portion 88 enters the recess 46 of the handle 40, and the handle 40 is completely downed. Therefore, the sliding of the lock plate 72 of the locking mechanism 70 is not hindered by the pair of handle receiving portions 44. When the latch mechanism 50 and the handle 40 are locked by the locking mechanism 70, the slider 81 is fixed to the fixed position by the handle 40, so that the storage case 1 is not attachable or detachable from the case holder 10. Accordingly, with the locking operation of the latch mechanism 50 and the handle 40, the fixing mechanism 80 is also locked by the handle 40 locked by the locking mechanism 70.

Figure 8:
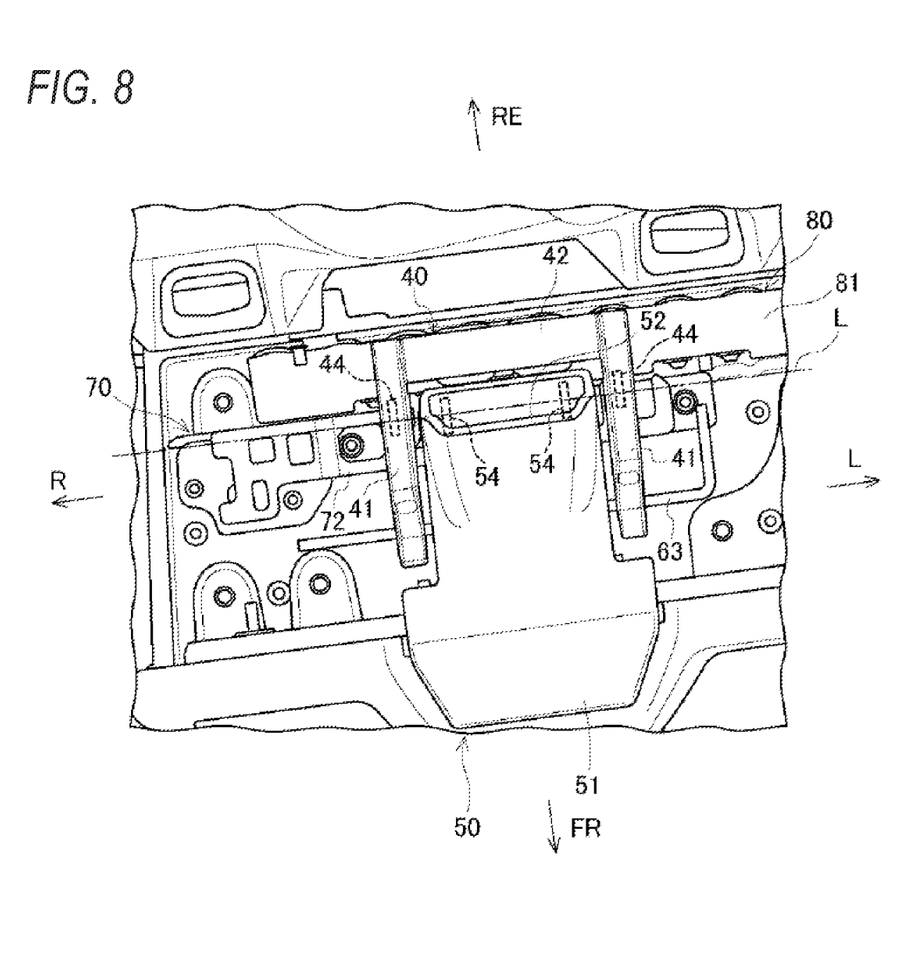
FIG. 8 is a diagram illustrating a layout of an upper portion of the storage case according to the present embodiment.

A layout of the upper portion of the storage case will be described with reference to FIG. 8. FIG. 8 is a diagram illustrating the layout of the upper portion of the storage case according to the present embodiment. Incidentally, FIG. 8 illustrates a state in which the installation cover is removed from an upper surface of the storage case.

As illustrated in FIG. 8, the base end side of the latch arm 51 is formed in a rectangular shape, and the tip side of the latch arm 51 is formed larger in the case width direction than the base end side. The handle 40 is formed in a U shape in a plan view along an outer edge of the latch arm 51 on the base end side. That is, a facing distance between the pair of support arms 41 of the handle 40 is larger than a width dimension of the latch arm 51 on the base end side, and the grip 42 of the handle 40 is further separated from the first swinging pin 63 than the base end side (the gripping portion 52) of the latch arm 51. In this way, since the base end side of the latch arm 51 is accommodated inside the handle 40, the handle 40 does not interfere with the latch mechanism 50 even if the handle 40 is downed.

The handle 40 is swingably connected to a plane to which the latch mechanism 50 is connected. Further, in the embodiment, both the handle 40 and the connecting arm 61 (see FIG. 4) of the latch mechanism 50 are supported by the first swinging pin 63. It is not necessary to separately prepare swinging pins for the handle 40 and the connecting arm 61, and the handle 40 and the latch mechanism 50 can be installed more compactly. One end of the first swinging pin 63 is bent in an L shape and prevented from rotating by the holding portion 67 (see FIG. 4), but the other end of the first swinging pin 63 is formed straight, and the first swinging pin 63 does not interfere with the key cylinder 71 (see FIG. 4) of the locking mechanism 70. As described above, the holding portion 67 for restricting the rotating of the first swinging pin 63 is provided on a side opposite to the key cylinder 71 in the case width direction. The holding portion 67 may prevent the rotating of the first swinging pin 63.

The lock plate 72 of the locking mechanism 70 extends in parallel with the first swinging pin 63, and is installed so as to overlap the handle 40 and the latch mechanism 50 in a plan view. In other words, the lock plate 72 of the locking mechanism 70 extends in parallel with the first swinging pin 63, and is installed so as to overlap the handle 40 and the latch mechanism 50 in a vertical direction perpendicular to a direction in which a swing shaft of the handle 40 extends and to a direction in which an open-close direction of the case cover 30. More specifically, when the handle 40 is downed, the lock plate 72 is positioned between a swing shaft of the pair of support arms 41 (a straight portion of the first swinging pin 63) and the grip 42. A pair of handle receiving portions 44 are formed on lower surfaces of the pair of support arms 41 corresponding to the locking pieces 74a, 74d (see FIG. 5) of the lock plate 72, and a pair of latch receiving portions 54 are formed on a lower surface of the latch arm 51 corresponding to the locking pieces 74b, 74c (see FIG. 5) of the lock plate 72.

Since centers of the openings of the handle receiving portions 44 and the latch receiving portions 54 are positioned at the same height, a height dimension of the lock plate 72 is suppressed. In other words, since the centers of the openings of the handle receiving portions 44 and the centers of the openings of latch receiving portions 54 are disposed at the same position in the vertical direction, the height dimension of the lock plate 72 is suppressed. Further, since the centers of the openings of the handle receiving portions 44 and the latch receiving portions 54 are positioned on a straight line L in the plan view, a width dimension of the lock plate 72 orthogonal to the straight line L is suppressed. In other words, since the centers of the openings of the handle receiving portions 44 and the latch receiving portions 54 are positioned on a straight line L in the vertical direction, the width dimension of the lock plate 72 orthogonal to the straight line L is suppressed. The lock plate 72 is formed long in the plan view and small in the height direction and the width direction, and a space occupied by the lock plate 72 is elongated in the case width direction. A part of the space occupied by the lock plate 72 overlaps spaces occupied by the handle 40 and the latch mechanism 50.

The slider 81 of the fixing mechanism 80 extends in parallel with the first swinging pin 63 and is installed so as to overlap the handle 40 in the plan view. More specifically, when the handle 40 is downed, the slider 81 is positioned directly below the grip 42. The slider 81 is formed long in the plan view, and a space occupied by the slider 81 is elongated in the case width direction. The slider 81 is adjacent to the lock plate 72, and a slide area of the lock plate 72 and a slide area of the slider 81 are arranged in parallel below the handle 40. A part of the space occupied by the slider 81 overlaps the space occupied by the handle 40.

In this way, the latch mechanism 50 is partially accommodated inside the handle 40, and the lock plate 72 of the locking mechanism 70 and the slider 81 of the fixing mechanism 80 are adjacent to each other in parallel. Further, the lock plate 72 and the slider 81 are positioned below the handle 40 and the latch mechanism 50, and the spaces occupied by the handle 40 and the latch mechanism 50 overlap spaces occupied by the locking mechanism 70 and the fixing mechanism 80. Therefore, the handle 40, the latch mechanism 50, the locking mechanism 70, and the fixing mechanism 80 are compactly installed on the upper portion of the storage case 1 without interfering with each other.

As described above, according to the present embodiment, since the base end side of the latch mechanism 50 is accommodated inside the handle 40, even if the handle 40 is downed, the handle 40 and the latch mechanism 50 do not interfere with each other, and the handle 40 and the latch mechanism 50 can be compactly installed on the upper surface of the storage case 1. Therefore, the number of components of the storage case 1 can be reduced, and the spaces occupied by the handle 40 and the latch mechanism 50 can be reduced, so that the size of the storage case 1 can be reduced.

Further, in the present embodiment, although the latch arm is connected to the case body via the connecting arm, the latch arm may be directly connected to the case body, or may be connected to the case body via another link mechanism.

Further, in the present embodiment, the single latch arm is hooked to the arm receiving portion including the plurality of plate-shaped protrusions, but the number of the latch arms and the number of the arm receiving portions are not particularly limited. For example, a plurality of the latch arms may be hooked to a plurality of the arm receiving portions, or a single latch arm may be hooked to a single arm receiving portion.

Further, in the present embodiment, the handle is formed in the U shape in the plan view, but the shape of the handle can be changed as appropriate. The handle includes the support arm swinging about the swing shaft extending in the case width direction and the grip extending from the support arm in the case width direction, and is formed as long as a part of the latch mechanism is located on a side of the grip from the support arm in the case width direction when the handle is downed. For example, the handle may be formed in an L shape in the plan view by one support arm and the grip.

Further, in the present embodiment, the handle and the latch mechanism (latch arm) are supported by the first swinging pin, but the handle and the latch mechanism may be supported by different swinging pins.

Further, in the present embodiment, storage cases are attached to left and right sides of the vehicle, but the storage cases may be attached to front and rear sides of the vehicle. Further, although the case body of the storage case is attached to the case holder, the case cover of the storage case may be attached to the case holder.

As described above, a storage case 1 according to the present embodiment is a storage case in which a case cover 30 is openably and closably connected to a case body 20, and includes a latch mechanism 50 configured to fix the case cover to the case body; and a handle 40 swingably connected to the case body, in which the handle includes support arms 41 swinging about a swing shaft extending in a case width direction, and a grip 42 extending from the support arms in the case width direction, and a part of the latch mechanism is located on a side of the grip from the support arms in the case width direction when the handle is downed. According to this configuration, since the part of the latch mechanism is located on the side of the grip from the support arms in the case width direction, the handle and the latch mechanism do not interfere with each other, and the handle and the latch mechanism can be compactly installed on one surface of the storage case even when the handle is downed. Therefore, the number of components of the storage case can be reduced, and spaces occupied by the handle and the latch mechanism can be reduced, so that a size of the storage case can be reduced.

In the storage case according to the present embodiment, the support arm is a pair of support arms, the grip connects the pair of support arms, the handle is formed in a U shape, and a part of the latch mechanism is accommodated inside the handle when the handle is downed. According to this configuration, the latch mechanism can be brought closer to the handle, and the spaces occupied by the handle and the latch mechanism can be reduced.

In the storage case according to the present embodiment, the handle is swingably connected to a plane to which the latch mechanism is connected. According to this configuration, the latch mechanism can be brought closer to the handle in a case where the handle is downed, and the spaces occupied by the handle and the latch mechanism can be further reduced.

In the storage case according to the present embodiment, a swing shaft of the handle and a swing shaft of the latch mechanism are formed by a same swinging pin (a first swinging pin 63). According to this configuration, the number of components can be reduced by sharing the swinging pin of the handle and the latch mechanism. Further, as compared with the configuration where swinging pins are provided for the handle and the latch mechanism individually, the latch mechanism can be brought closer to the handle, and the spaces occupied by the handle and the latch mechanism can be further reduced.

In the storage case of the present embodiment, the swinging pin is restricted from rotating. According to this con-figuration, the handle and the latch mechanism can be prevented from rotating together.

Although the present embodiment has been described, the above-described embodiment and the modification may be combined in whole or in part as another embodiment.

The technique of the present invention is not limited to the above-described embodiment, and various changes, substitutions, and modifications may be made without departing from the spirit of the technical idea of the present invention. Further, the present invention may be implemented using other methods as long as the technical concepts can be implemented by the methods through advance of the technology or other derivative technology. Accordingly, the claims cover all embodiments that may be included within the scope of the technical concepts.

What is claimed is:

1. A storage case in which a case cover is openably and closably connected to a case body, the storage case comprising:
    a latch mechanism configured to fix the case cover to the case body; and
    a handle that makes the storage case portable, the handle being swingably connected to the case body,
    wherein the handle includes a pair of support arms swinging about a swing shaft extending in a case width direction, and a grip extending from the pair of support arms in the case width direction,
    wherein the grip connects the pair of support arms, and the handle is formed in a U shape,
    wherein a part of the latch mechanism is accommodated inside the handle when the handle is down,
    wherein the swing shaft of the handle and a swing shaft of the latch mechanism are formed by a swinging pin, the swinging pin providing an axis of rotation for the handle and the latch mechanism, the handle and the latch mechanism being independently rotatable about the swinging pin,
    wherein the latch mechanism includes a latch arm of which a hook is formed on a tip side and a gripping portion is formed on a base end side, the hook being configured to lock the case cover against the case body in the closed state, the gripping portion being configured to operate the latch arm,
    wherein a facing distance between the pair of support arms of the handle is larger than a width dimension of the latch arm on the base end side, and
    the grip of the handle is further separated from the swinging pin than the gripping portion of the latch arm, and
    wherein the gripping portion on the base end side of the latch arm is accommodated inside the support arm in the case width direction when the handle is downed, and
    wherein, when viewed from a direction of the swinging pin, the pair of support arms of the handle overlaps with the gripping portion on the base end side of the latch arm when the handle is down.

2. The storage case according to claim 1, wherein the swinging pin is restricted from rotating.

3. The storage case according to claim 2, wherein the swinging pin is bent in an L shape.

4. The storage case according to claim 1, wherein the gripping portion is configured to operate the latch arm so that the hook locks the case cover against the case body.

5. The storage case according to claim 1,
wherein the handle is connected to a plane of the case body to which the latch mechanism is connected.

6. The storage case according to claim 1,
wherein the latch arm is connected to the case body via a connecting arm, the connecting arm is connected to the case body via the swinging pin about which the pair of support arms is swinging.

7. A storage case in which a case cover is openably and closably connected to a case body, the storage case comprising:
   a latch mechanism configured to fix the case cover to the case body; and
   a handle that makes the storage case portable, the handle being swingably connected to the case body,
   wherein the handle includes a pair of support arms swinging about a swinging pin extending in a case width direction, and a grip extending from the pair of support arms in the case width direction,
   wherein the swinging pin provides a rotational axis for the handle and the latch mechanism, the handle and the latch mechanism being independently rotatable about the swinging pin,
   wherein the latch mechanism includes a latch arm of which a hook is formed on a tip side and a gripping portion is formed on a base end side, the hook being configured to lock the case cover against the case body in the closed state, the gripping portion being configured to operate the latch arm,
   wherein a facing distance between the pair of support arms of the handle is larger than a width dimension of the latch arm on the base end side, and
   the grip of the handle is further separated from the swinging pin than the gripping portion of the latch arm, and
   wherein the gripping portion on the base end side of the latch arm is completely accommodated inside the support arm in the case width direction when the handle is down.

* * * * *